(12) United States Patent
You et al.

(10) Patent No.: US 12,190,115 B2
(45) Date of Patent: Jan. 7, 2025

(54) PROCESSING CALL AND RETURN INFORMATION DUE TO A BRANCH PREDICTION ERROR

(71) Applicant: Fujitsu Limited, Kawasaki (JP)

(72) Inventors: Chunye You, Kawasaki (JP); Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 18/206,163

(22) Filed: Jun. 6, 2023

(65) Prior Publication Data
US 2024/0086197 A1 Mar. 14, 2024

(30) Foreign Application Priority Data
Sep. 13, 2022 (JP) ................................ 2022-145583

(51) Int. Cl.
*G06F 9/38* (2018.01)

(52) U.S. Cl.
CPC .......... *G06F 9/3806* (2013.01); *G06F 9/3867* (2013.01)

(58) Field of Classification Search
CPC .... G06F 9/3806; G06F 9/3867; G06F 9/3836; G06F 9/3861; G06F 9/3844
See application file for complete search history.

(56) References Cited

U.S. PATENT DOCUMENTS

| | | | |
|---|---|---|---|
| 2007/0130451 A1* | 6/2007 | Caprioli | G06F 9/3861 |
| | | | 712/E9.05 |
| 2013/0275726 A1* | 10/2013 | Ukai | G06F 9/323 |
| | | | 712/221 |
| 2019/0354368 A1 | 11/2019 | Okazaki | |
| 2020/0117461 A1* | 4/2020 | Fujita | G06F 9/3844 |
| 2021/0004234 A1 | 1/2021 | Hu et al. | |
| 2021/0019149 A1* | 1/2021 | Chauhan | G06F 9/3804 |

FOREIGN PATENT DOCUMENTS

| | | |
|---|---|---|
| JP | 2019-200523 A | 11/2019 |
| JP | 2021-516384 A | 7/2021 |

* cited by examiner

*Primary Examiner* — Shawn Doman
(74) *Attorney, Agent, or Firm* — WHDA, LLP (57) ABSTRACT

A processor configured to store prediction information that is obtained from a call instruction that is fetched in a RAS fetch, acquire the prediction information that is used in a return instruction from the RAS fetch, delete the prediction information, store the prediction information in a RAS complete after completion of execution of the call instruction, and delete the prediction information from the RAS complete after completion of execution of the return instruction, and specify a first entry that is the closest to a top of the queue among the entries in which the branch instruction on which the branch prediction error is detected is re-executed, store and delete the prediction information in and from the RAS fetch according to the call instruction and the return instruction that are stored in entries closer to the top than the first entry is, and cause the first entry to be re-executes.

7 Claims, 5 Drawing Sheets

PROCESSING CALL AND RETURN INFORMATION DUE TO A BRANCH PREDICTION ERROR

CROSS-REFERENCE TO RELATED APPLICATION

This application is based upon and claims the benefit of priority of the prior Japanese Patent Application No. 2022-145583, filed on Sep. 13, 2022, the entire contents of which are incorporated herein by reference.

FIELD

The embodiment discussed herein is related to a computing device, am computing method, and an information processing device.

BACKGROUND

Programs that a processor executes include one containing a branch instruction. Execution of a branch instruction includes a case where the branch is not taken and execution is continued from an instruction immediately following the branch instruction in a program counter and a case where the branch is taken and execution is continued from an instruction in a different position in the program. When the branch instruction is executed, whether the branch is taken or not taken is not determined until the branch instruction passes an execution stage. The state in which an instruction passes an execution stage in an instruction pipeline is referred to as completion of the process of the instruction.

When there is a branch instruction, an instruction that is executed subsequently depends on the result of execution of the branch instruction. For this reason, the pipeline stalls until the branch instruction reaches the execution stage. A measure that is generally taken to cancel the stall is instruction speculative execution. The instruction speculative execution refers to predicting a result of execution of a branch instruction before the result of execution of the branch instruction is proved and starting execution of an instruction following the branch based on the prediction result. Prediction of the result of execution of the branch instruction is referred to as branch prediction. When the branch prediction is correct, the pipeline flows as if the pipeline has no branch and the stall can be removed.

On the other hand, when the branch prediction is wrong, the processor disables the instruction that is entered into the pipeline based on the branch prediction and enters an instruction in a direction opposite to the result of prediction into the pipeline again. When the branch prediction is wrong, the processor detects a branch prediction error and makes a re-instruction-fetch from the address of a correct branch instruction and, at the same time, clears execution of the erroneous path from the pipeline. The re-instruction-fetch is issued from a system that processes a branch instruction, such as a reservation station for branch instructions, toward an instruction fetch. A case where an RSBR (Reservation Station for Branch) is used as the system that processes the branch instruction will be described here.

A conventional RSBR processes a branch instruction in order and, even if a branch prediction error turns out and it is obvious to perform a re-instruction-fetch, waits for completion of the process of a foregoing branch instruction until the branch instruction is at the top of que (TOQ) that the RSBR includes. When the process of the foregoing branch instruction completes and a branch is determined and the branch instruction that requires a re-instruction-fetch is at the TOQ, the RSBR outputs a re-instruction-fetch request of the branch instruction. In this case, even when a branch prediction error is determined, the RSBR waits for an output of the re-instruction-fetch until the process of the foregoing branch instruction completes and, because the process stops for the time of waiting, a loss in performance occurs.

If the RSBR is able to output a re-instruction-fetch ahead against such a loss, it is possible to hide a delay according to the time of the process of the pipeline until the instruction fetch. In other words, when a branch prediction error occurs, by executing a re-instruction-fetch request with respect to the branch instruction out of order, the RSBR is able to process an instruction that is acquired by the re-instruction-fetch earlier by the wait time than in a case where the re-instruction-fetch instruction is issued in order.

When the re-instruction-fetch request is executed out of order, it is assumed that a branch prediction does not reflect a call instruction and a return instruction between the branch on which the re-instruction fetch is to be performed and the TOQ. In that case, a problem that accuracy of branch prediction using a return address stack (RAS) lowers occurs.

The return address stack uses a RAS fetch that is based on an instruction fetch and that makes an update using the instruction fetch as a reference and a RAS complete that is based on completion of the branch process and that makes an update using, as a reference, a branch complete that is a state in which execution of the branch instruction completes. For a call instruction, the processor stores, in the RAS fetch, an address of a return destination of the call instruction at the stage of the instruction fetch. Storing the return destination address is referred to as push. For a return instruction, the processor acquires a return destination address of a corresponding call instruction from the RAS fetch at the stage of the instruction fetch. Acquiring a return destination address is referred to as pop. At the stage of completion of the process of the instruction, the processor pushes the RAS complete for a call instruction and pops the RAS complete for a return instruction as a backup. Basically, the processor makes a prediction while performing pop and push for the call instruction and the return instruction, respectively, using the RAS fetch. When performing a re-instruction-fetch, the processor starts the re-instruction-fetch after copying the information of the RAS complete into the RAS fetch for reflection of the information on the branch instruction.

Accordingly, when a re-instruction-fetch is output from the TOQ, the process of a branch instruction is performed in order and therefore the RAS complete reflects information on the branch instruction until the TOQ. The processor processes the instruction on which the re-instruction-fetch is performed after restoring the information on all call instructions and return instructions before the branch instruction on which the re-instruction fetch is performed and therefore it is possible to make a prediction using the return address stack.

Note that, a technique of issuing an entry that is first issuable after the TOQ out of order and, in a case of a load instruction before a barrier macro instruction, deterring speculative issuance of a load instruction until a queue-in in a fetch port has been proposed as a technique of branch prediction. A technique of determining target prediction information with respect to a branch instruction based on program identification information and a branch prediction table, performing a prediction process based on the target prediction information, and generating a prediction result with respect to the branch instruction has been proposed.

Patent Literature 1: Japanese Laid-open Patent Publication No. 2019-200523

Patent Literature 2: Japanese National Publication of International Patent Application No. 2021-516384

In a case where a re-instruction fetch is issued out of order, however, when there is a call instruction and a return instruction between a branch instruction on which a re-instruction-fetch is to be issued out of order and the TOQ, the RAS complete does not reflect the information on the call and return instructions. Thus, even if the processor copies the information of the RAS complete into the RAS fetch, it is difficult to reflect the addresses of the return destinations of the instructions in execution of a return address stack.

For example, a case where a call instruction A and a call instruction B are processed in this order and addresses of return destinations of the instructions are A+4 and B+4, respectively, will be described. In this case, when, after the call instruction A reaches the stage of completion of the process, a branch prediction error occurs with the call instruction B not having completed and a re-instruction-fetch request of the branch instruction is issued out of order, the following problem occurs. At the time when the re-instruction-fetch request is issued, the RAS complete reflects A+4 that is the address of the return destination of the call instruction A but does not reflect B+4 that is the address of the return destination of the call instruction B. For this reason, when the information of the RAS complete is copied directly into the PAS fetch, the RAS fetch does not reflect B+4 that is the address of the return destination of the call instruction B. As a result, the processor fails in branch prediction using a return address stack.

In the case where a branch prediction error occurs once as described above, there is a possibility that executing a re-instruction fetch request with respect to a branch out of order will have an effect on a branch prediction using the return address stack and accuracy of prediction will deteriorate. For this reason, in the case where a branch prediction error occurs, it has been difficult to execute a re-instruction fetch request with respect to a branch out of order. The conventional technique thus has a difficulty in increasing the processing rate of the re-instruction-fetch while maintaining accuracy of prediction and in increasing computing performance of the computing device.

SUMMARY

According to an aspect of an embodiment, a computing device includes, a pipeline that fetches an instruction and executes the instruction, a queue that stores a plurality of entries including a call instruction and a return instruction and in which the pipeline is caused to execute a branch instruction, a memory, and a processor coupled to the memory and configured to store prediction information that is obtained from the call instruction that is fetched by the pipeline in a first storage, acquire the prediction information that is used in the return instruction that is fetched by the pipeline from the first storage, delete the prediction information, stores the prediction information in a second storage after completion of execution of the call instruction by the pipeline, and delete the prediction information from the second storage after completion of execution of the return instruction by the pipeline; and detect a branch prediction error with respect to the branch instruction, specify a first entry that is the closest to a top of the queue among the entries in which the branch instruction on which the branch prediction error is detected is re-executed, store and delete the prediction information in and from the first storage according to the call instruction and the return instruction that are stored in entries closer to the top of the queue than the first entry is, and cause the pipeline to re-execute the first entry.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The following embodiment does not limit the arithmetic processing device, the arithmetic processing method, and the information processing device disclosed herein.

Figure 1:
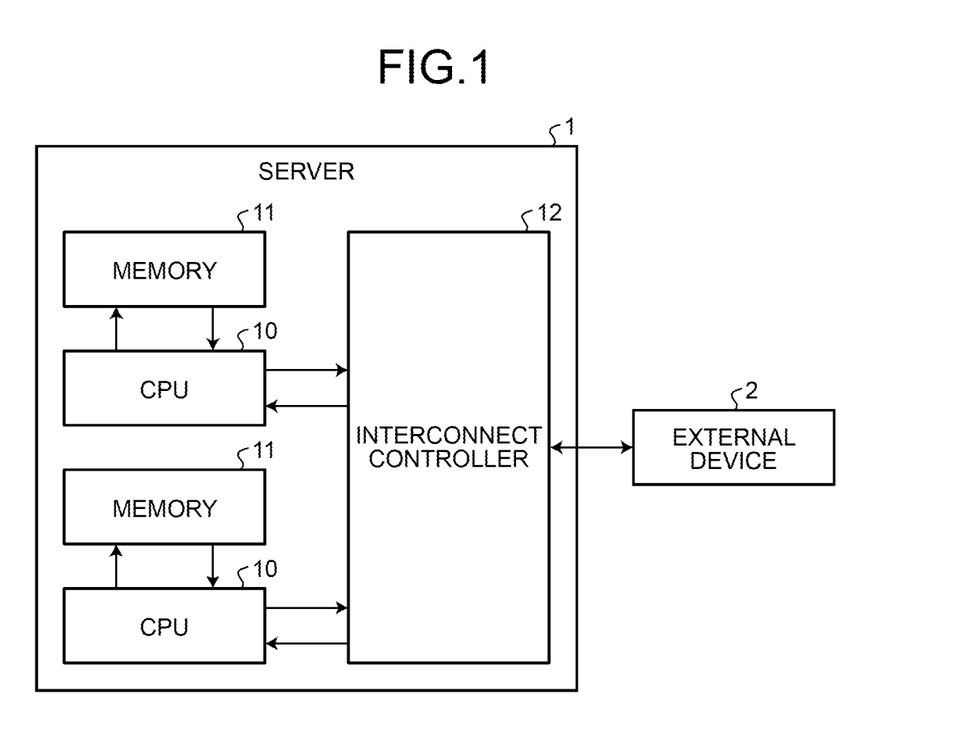
FIG. 1 is a diagram illustrating a configuration example of a system according to an embodiment.

FIG. 1 is a diagram illustrating a configuration example of a system according to the embodiment. A system according to the embodiment is, for example, a server 1 illustrated in FIG. 1.

The server 1 is an information processing device that includes a plurality of central processing units (CPUs) 10, a plurality of memories 11, and an interconnect controller 12.

The interconnect controller 12 relays communication of the CPU 10. For example, the interconnect controller 12 relays communication between the CPUs 10. The interconnect controller 12 relays communication between each of the CPUs 10 and an external device 2.

The memory 11 is a main storage device. The memory 11 is, for example, a dynamic random access memory (DRAM).

The CPUs 10 are connected to different memories 11, respectively. Each of the CPUs 10 is connected to the interconnect controller 12. The CPU 10 is an example of a "computing device" and an "computing unit".

The CPU 10 communicates with other CPUs 10 and the external device 2 via the interconnect controller 12. The CPU 10 executes various types of programs using the memory 11.

The CPU 10 according to the embodiment executes a program by pipeline processing. Furthermore, when executing the program, the CPU 10 stores and manages a branch instruction as an entry of a queue that a system that processes the branch instruction has and manages the branch instruction. The CPU 10 further performs branch prediction on the branch instruction and executes the program.

When a branch prediction error occurs, the CPU 10 performs, out of order, a re-instruction-fetch for continuing the process from the correct address of the branch instruction with respect to the entry on which the branch prediction error occurs in the que in which the branch instruction is stored. The CPU 10 makes a search on whether there is an entry on which a re-instruction-fetch is to be performed among entries closer to the TOQ than the entry is in the queue in which the branch instruction is stored and specifies the entry on which a re-instruction-fetch is to be performed out of order.

The CPU 10 copies information from a RAS complete into a RAS fetch. Furthermore, the CPU 10 searches for a call instruction and a return instruction that are between the specified entry and the TOQ. On detecting a call instruction, the CPU 10 pushes the RAS fetch. On detecting a return instruction, the CPU 10 pops the RAS fetch. The CPU 10 then executes a re-instruction-fetch of the branch instruction that is specified by the specified entry. An example of the details of the CPU 10 will be described below.

Figure 2:
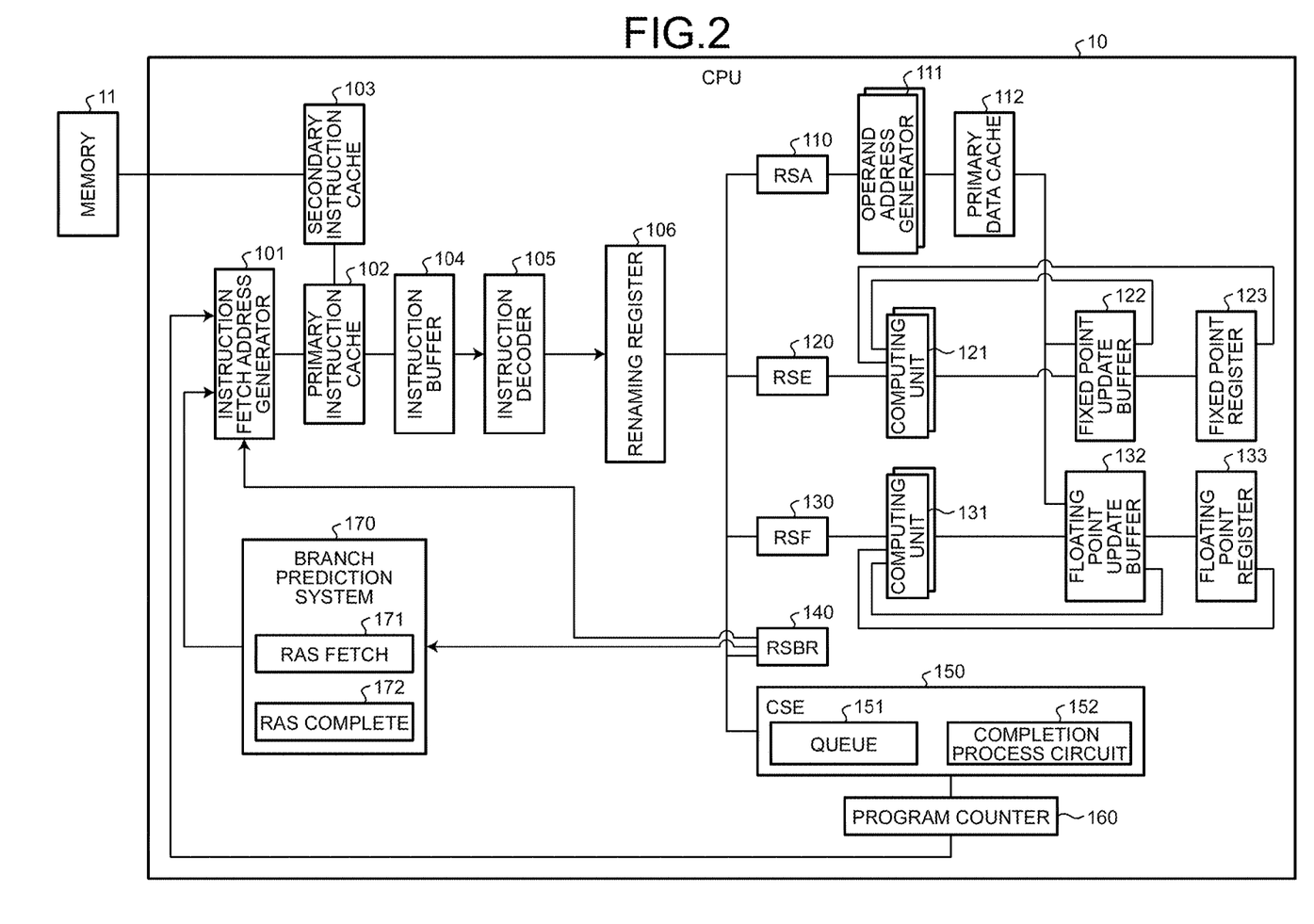
FIG. 2 is a diagram illustrating a configuration example of a superscalar processor according to the embodiment.

FIG. 2 is a diagram illustrating a configuration example of a superscalar processor according to the embodiment. The case where the CPU 10 is a superscalar processor that performs a plurality of pipeline processes in parallel will be exemplified and described here. FIG. 2 is an example of the CPU 10. The CPU 10 may be a processor having a different configuration.

As illustrated in FIG. 2, the CPU 10 includes an instruction fetch address generator 101, a primary instruction cache 102, a secondary instruction cache 103, an instruction buffer 104, an instruction decoder 105, and a renaming register 106. The CPU 10 further includes a reservation station for address generation (RSA) 110, an operand address generator 111, and a primary data cache 112. The CPU 10 further includes a reservation station for execution (RSE) 120, a computing unit 121, a fixed point update buffer 122, a fixed point register 123, a reservation station for floating point (RSF) 130, a computing unit 131, a floating point update buffer 132, and a floating point register 133. The CPU 10 further includes a RSBR 140, a commit stack entry (CSE) 150, a program counter (PC) 160, and a branch prediction system 170. The system including units other than the secondary instruction cache 103 in the CPU 10 is sometimes referred to as a core. Each reservation station, such as the RSA 110, the RSE 120, the RSF 130, or the RSBR 140, is a system that stores an instruction until the instruction is executable. Each of the RSA 110, the RSE 120, the RSF 130, and the RSBR 140 includes a queue.

The instruction fetch address generator 101, the instruction buffer 104, and the instruction decoder 105 correspond to a pipeline that executes an instruction. The instruction fetch address generator 101 and the instruction buffer 104 correspond to an instruction fetch system.

The instruction fetch address generator 101 receives an input of a fetch address of an instruction according to an order of a program from the program counter 160. The instruction fetch address generator 101 receives the input of the fetch address obtained by branch prediction by the branch prediction system 170.

When no fetch address is specified by the branch prediction system 170, the instruction fetch address generator 101 processes instructions in the order in which the instructions are acquired from the program counter 160. When a fetch address is specified by the branch prediction system 170, the instruction fetch address generator 101 processes the instruction of the specified fetch address and then continues processing instructions following the instruction in the order in which the instructions are acquired from the program counter 160.

The instruction fetch address generator 101 processes each instruction as follows. When a cache hit of the instruction of the specified fetch address is in the primary instruction cache 102, the instruction fetch address generator 101 stores the instruction, which is stored in the primary instruction cache 102, in the instruction buffer 104. On the other hand, when a cache miss is in the primary instruction cache 102, the instruction fetch address generator 101 searches for the instruction of subject in the secondary instruction cache 103. When a cache hit is in the secondary instruction cache 103, the instruction fetch address generator 101 stores the instruction, which is stored in the secondary instruction cache 103, in the primary instruction cache 102 and causes the instruction buffer 104 to store the instruction. When a cache miss is in the secondary instruction cache 103, the instruction fetch address generator 101 acquires the instruction from the memory 11. Thereafter, the instruction fetch address generator 101 causes the primary instruction cache 102 to store the instruction that is stored in the secondary instruction cache 103 and causes the instruction buffer 104 to store the instruction.

The instruction buffer 104 is a buffer that stores a sequence of instructions to be executed in the future. The instruction buffer 104 stores instructions to the maximum regardless of the state of execution of the instructions. The instruction buffer 104 is able to output the instructions stored therein regardless of the state of the instruction fetch. The instruction buffer 104 separates the instruction fetch and the instruction execution, thereby hiding latency due to the instruction execution and the instruction fetch.

The instruction decoder 105 acquires the instructions that are stored in the instruction buffer 104 in the processing order. The instruction decoder 105 decodes the acquired instruction and outputs the decoded instruction to the renaming register 106.

The renaming register 106 is a buffer that temporarily stores the instruction until execution of the instruction is committed and the instruction is stored in the register. The renaming register 106 receives the input of the decoded instruction from the instruction decoder 105. The renaming register 106 then determines a resource that is used for execution of the instruction from the RSA 110, the RSE 120, the RSF 130, and the RSBR 140. The renaming register 106 determines whether there is a vacancy in the determined resource. When there is a vacancy in the determined resource, the renaming register 106 allocates the determined resource to the decoded instruction. Thereafter, the renaming register 106 assigns an identification to the decoded instruction and issues the instruction to the allocated one of the RSA 110, the RSE 120, the RSF 130, and the RSBR 140.

The renaming register 106 also assigns instruction identifications (IIDs) to the respective decoded instructions according to the order. The renaming register 106 transmits the instructions to the CSE 150 according to the order in which the instruction identifications are assigned.

The RSA 110 is a reservation station for calculating an address of a load/store instruction. A load/store instruction is any one of a load instruction and a store instruction. The RSA 110 stores the instruction that is acquired from the instruction decoder 105 until processing by the operand address generator 111 is available. Thereafter, when processing by the operand address generator 111 is available, the RSA 110 outputs the instruction to the operand address generator 111. The RSA 110 executes the load/store instruction out of order. Thereafter, when execution of the load/ store instruction completes, the RSA 110 reports on ending of execution of the instruction to the CSE 150.

There are the operand address generators 111. The operand address generator 111 receives an input of the load/store instruction from the RSA 110. The operand address generator 111 generates an operand for calculating an address and executes an address calculation using the generated address to generate an address corresponding to the instruction. Thereafter, the operand address generator 111 waits for store data and writes the data in the primary data cache 112 using the generated address.

The RSE 120 is a reservation station for integer computation. The RSE 120 stores the instruction that is acquired from the instruction decoder 105 until computing by the computing unit 121 is available. Thereafter, when computing by the computing unit 121 is available, the RSE 120 outputs the instruction to the computing unit 121. The RSE 120 executes the instruction out of order. Thereafter, when execution of computing on the instruction completes, the RSE 120 reports on ending of execution of the instruction to the CSE 150.

There are the computing units 121. The computing unit 121 executes fixed point computing using the fixed point update buffer 122 and the fixed point register 123. After the computing completes, the resultant data is written in the fixed point register 123 via the fixed point update buffer 122. Thereafter, when calculation data is committed, the committed calculation data is transmitted to the primary data cache 112.

The RSF 130 is a reservation station for floating point computation. The RSF 130 stores the instruction that is acquired from the instruction decoder 105 until computing by the computing unit 131 is available. Thereafter, when computing by the computing unit 131 is available, the RSF 130 outputs the instruction to the computing unit 131. The RSF 130 executes the instruction out of order. Thereafter, when execution of computing on the instruction completes, the RSF 130 reports on ending of execution of the instruction to the CSE 150.

There are the computing units 131. The computing unit 131 executes floating point computing using the floating point update buffer 132 and the floating point register 133. After the computing completes, the resultant data is written in the floating point register 133 via the floating point update buffer 132. Thereafter, when calculation data is committed, the committed calculation data is transmitted to the primary data cache 112.

The CSE 150 is a circuit that executes a commit (determination) process. The CSE 150 includes a queue 151 that is a storage having a queue configuration of accumulating the decoded instructions according to the order in which the instructions are to be executed and a completion process circuit 152 that performs a commit process based on the information of the queue 151 and a completion report from each process pipe.

The queue 151 stores and accumulates the instructions that are received from the renaming register 106 according to the order of execution. The CSE 150 waits for the report on completion of processing of the instruction with the instructions being stored in the queue.

The completion process circuit 152 receives the report on the ending of each executed instruction from the RSA 110, the RSE 120 and the RSF 130 out of order. The completion process circuit 152 receives a signal on completion of processing of the instruction from the RSBR 140 in order.

The completion process circuit 152 reorders the instruction according to the order of execution and notifies the queue 151 of the ending of the instruction corresponding to the report made by the signal on completion of processing among the instructions waiting for ending reports and accumulated in the queue 151. Accordingly, the completion process circuit 152 commits the instruction of which ending is notified among the instructions that are stored in the queue 151 to update the resource.

The RSBR 140 is a reservation station for branch instructions. The RSBR 140 updates a RAS fetch 171 and the RAS complete 172 that are used in a return address stack and issues a signal of a re-instruction-fetch, or the like.

The RSBR 140 receives an input of a branch instruction from the instruction decoder 105. The RSBR 140 stores the branch instruction in an RSBR queue that the RSBR 140 has. The RSBR queue is a queue that performs FIFO (First In First Out) operations. Each entry in the RSBR queue stores a prediction result of a branch prediction indicating the branch is taken or not taken and a predicted address.

The RSBR 140 receives a result of computing by the computing unit 121 or 131 from the RSE 120 or the RSF 130. The RSBR 140 determines which one of taken or not-taken occurs in the branch instruction from the computing result that is obtained with respect to each entry. For example, when the CPU 10 is an ARM-based processor, the RSBR 140 acquires the value that is stored in a NZCV register based on the computing result of a NZCV determination instruction and makes a determination. The RSBR 140 determines a target address of the instruction that is stored with respect to each entry.

The RSBR 140 generally processes the branch instruction that is stored in the RSBR queue in order. In other words, the RSBR 140 sequentially processes instructions that are stored in the entries of the TOQ of the RSBR queue. Note that, as illustrated below, the RSBR 140 outputs, out of order, a re-instruction-fetch request in the case where a branch-prediction error occurs.

Using the result of determination on the branch of each entry, the RSBR 140 determines whether a branch prediction error occurs in each branch instruction. Here, the branch instruction on which it is determined whether a branch prediction error occurs is referred to as a determination target branch instruction. When it is determined that a branch prediction error occurs, the RSBR 140 determines a re-instruction-fetch with respect to the determination target branch instruction. The RSBR 140 then stores an entry of the re-instruction-fetch request on the determination-target branch instruction in the RSBR queue. The RSBR 140 further clears the instruction before the decoding in the pipeline and clears the pipeline.

The RSBR 140 then searches for an entry between the entry of the re-instruction-fetch request on the determination-target branch instruction and the TOQ and determines whether there is another entry of a re-instruction-fetch request in the entry.

The RSBR 140 specifies an entry of a re-instruction-fetch request that is the closest to the TOQ between the entry of the re-instruction-fetch request of the determination-target branch instruction and the TOQ. When there is no entry of a re-instruction-fetch request on the side of the TOQ with respect to the determination-target branch instruction, the RSBR 140 specifies the determination-target branch instruction as the entry of the re-instruction-fetch request that is the closest to the TOQ. The entry that is specified by the RSBR 140 is referred to as "the entry of the re-instruction-fetch request" below. The entry of the re-instruction-fetch request corresponds to an example of "the first entry".

The RSBR 140 then deletes active flags of entries that is farther from the TOQ than the entry of the re-instruction-fetch request to inactivate the flags. In this manner, the RSBR 140 deletes unnecessary entries that occur due to the prediction error.

The RSBR 140 then outputs the re-instruction-fetch request that is acquired from the entry of the re-instruction-fetch request to the instruction fetch address generator 101 and the branch prediction system 170. Note that the RSBR. 140 adds information for deterring the start of the re-instruction fetch to the re-instruction-fetch request. Accordingly, the RSBR 140 deters execution of the re-instruction fetch while outputting the re-instruction-fetch request. The RSBR 140 also stops generating a new entry. The RSBR 140 then copies information of the RAS complete 172 in the branch prediction system 170 into the RAS fetch 171. The RSBR 140 stores the number of the entry of the re-instruction fetch.

The RSBR 140 then searches through from the entry of the re-instruction-fetch to the entry of the TOQ to detect a call instruction and a return instruction that is between the entries. Each of the entries in the RSBR queue stores, as a flag, information on whether the entry is a call instruction or information on whether the entry is a return instruction. On detecting a call instruction, the RSBR 140 pushes the RAS fetch 171 and stores an address of a return destination of the call instruction in the RAS fetch 171. On detecting a return instruction, the RSBR 140 pops from the RAS fetch 171, acquires a return destination address of a call instruction corresponding to the return instruction, and deletes the return address from the RAS fetch 171.

The RSBR 140 transmits an end signal notifying that the process of each branch instruction completes to the CSE 150 in order. By transmitting the signal notifying completion of the process, the RSBR 140 determines that the branch instruction completes and determines ending of the branch instruction. Furthermore, the RSBR 140 outputs the call instruction or the return instruction in association with the signal notifying the completion of the process to the branch prediction system 170. By outputting a signal notifying completion of the process of the call instruction to the branch prediction system 170, the RSBR 140 pushes the RAS complete 172 and stores the address of the return destination of the call instruction in the RAS complete 172. By outputting the signal on completion of the process of the return instruction to the branch prediction system 170, the RSBR 140 pops the RAS complete 172 and deletes a return destination address of a call instruction corresponding to the return instruction.

Thereafter, the RSBR 140 removes the information for deterring the start of the re-instruction fetch that is added to the re-instruction-fetch request that is transmitted to the instruction fetch address generator 101. Accordingly, the RSBR 140 causes the instruction fetch address generator 101 to execute the re-instruction-fetch. The RSBR 140 is an example of the "branch instruction processor".

The branch prediction system 170 executes a return address stack. The branch prediction system 170 includes the RAS fetch 171 and the RAS complete 172. The RAS fetch 171 corresponds to an example of "a first storage unit" and the RAS complete 172 corresponds to an example of "a second storage unit".

Once a call instruction is fetched by the instruction fetch address generator 101, the branch prediction system 170 pushes the RAS fetch 171 and stores a return destination address of the fetched call instruction in the RAS fetch 171. Once a return instruction is fetched by the instruction fetch address generator 101, the branch prediction system 170 pops the RAS fetch 171, acquires a return destination address of a call instruction corresponding to the fetched return instruction and deletes the return destination address from the RAS fetch 171.

On receiving a signal indicating ending of a call instruction from the RSBR 140, the branch prediction system 170 pushes the RAS complete 172 and stores a return destination address of the fetched call instruction in the RAS complete 172. On receiving a signal indicating ending of a return instruction from the RSBR 140, the branch prediction system 170 pops the RAS complete 172, acquires a return destination address of a call instruction corresponding to the fetched return instruction, and deletes the return destination address from the RAS complete 172.

When a branch prediction error occurs and a re-instruction-fetch request that is transmitted from the RSBR 140 is received, the branch prediction system 170 copies the information of the RAS complete 172 into the RAS fetch 171. Thereafter, in the branch prediction system 170, the RAS fetch 171 is pushed by the RSBR 140 with respect to a call instruction of an entry before the entry of the re-instruction-fetch request. In the branch prediction system 170, the RAS fetch 171 is popped by the RSBR 140 with respect to a return instruction of an entry before the entry of the re-instruction-fetch request.

Figure 3:
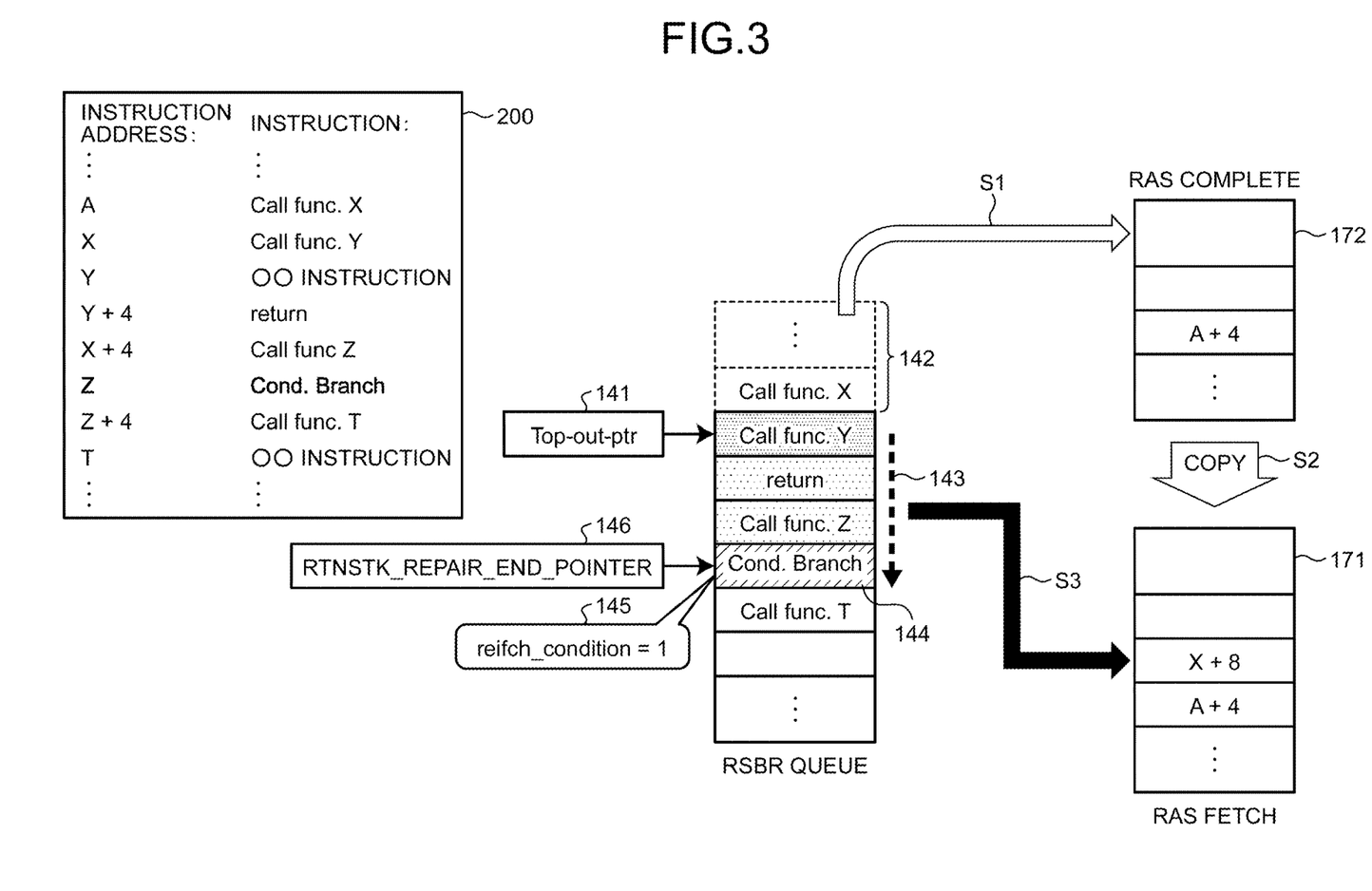
FIG. 3 is a diagram illustrating an overview of a process in a case where a re-instruction-fetch request is output out of order in a computing device according to the embodiment.

FIG. 3 is a diagram illustrating an overview of a process in a case where a re-instruction-fetch request is output out of order in the computing device according to the embodiment. With reference to FIG. 3, specific operations and the overview of the process in the case where a re-instruction-fetch request is output out of order will be described collectively next.

The RSBR 140 manages an entry of TOQ by a pointer 141 that is presented as TOP-out-ptr in FIG. 3. In other words, the entry that is specified by the pointer 141 is the entry of TOQ.

For example, an instruction list 200 presents instructions that are arranged in an order in which the instructions are registered in the program counter 160. When instructions are arranged in the order in the instruction list 200, the RSBR 140 stores Call func. X, Call func. Y, Call func. Z, Cond. branch, and Call func. T in order in the RSBR queue. When a branch instruction ends and the ending is determined, the RSBR 140 moves the pointer 141 to the next instruction. In other words, in the state in FIG. 3, the RSBR 140 has ended execution of the entries that are in an area 142 and has transmitted signals indicating ending of the instructions of these entries to the branch prediction system 170. For this reason, the branch prediction system 170 has executed push or pop on the RAS complete 172 corresponding to a call instruction or a return instruction that is in the area 142 of the RSBR queue (step S1). In this case, A+4 that is a return address of Call func. X is stored in the RAS complete 172.

Thereafter, the RSBR 140 processes each of the entries that are stored in the RSBR queue from the entry of Call func. Y sequentially in the direction indicated by an arrow 143. The RSBR 140 detects a branch prediction error in Cond. branch of an entry 144. At that time, Call func. Z has been fetched and thus the branch prediction system 170 has pushed X+8 that is a return destination address of a call instruction that is Call func. Z to the RAS fetch 171. The process of Call func. Z however has not completed and therefore the branch prediction system 170 has not pushed X+8 that is the return destination address of the call instruction that is Call func. Z to the RAS complete 172.

On detecting a branch prediction error by Cond. branch of the entry 144, the RSBR 140 sets a value of a flag 145 that is Reifch_condition of the entry 144 at 1. The RSBR 140 refers to the value of Reifch_condition of each of the entries and, when there is even only one entry in which the value of Reifch_condition is 1 in the RSBR 140, clears the pipeline before decoding.

The RSBR 140 then specifies, as an entry of a re-instruction-fetch request, an entry that is the closest to the TOQ among the entries in which the value of Reifch_condition is 1. In this case, the RSBR 140 specifies the entry 144 as an entry of a re-instruction-fetch request. The RSBR 140 then deletes active flags of entries that are farther from the entry of the TOQ indicated by the pointer 141 than the entry 144 to inactivate the flags.

The RSBR 140 then outputs the re-instruction-fetch request based on the entry 144 to the instruction fetch address generator 101 and the branch prediction system 170. On receiving the re-instruction-fetch request, the branch prediction system 170 copies the information of the RAS complete 172 into the PAS fetch 171 (step S2). Accordingly, X+8 that is the return address of the call instruction that is Call func. Z that the RAS fetch 171 reflects is rewritten and disappears from the RAS fetch 171.

Furthermore, the RSBR 140 sets, at 1, the value of return adrs stack repair tgr that is a trigger that is added to the re-instruction-fetch request transmitted to the instruction fetch address generator 101 and that indicates that the return address stack is under repair. By setting the value of return adrs stack repair tgr at 1 deters execution of the re-instruction-fetch in the state where the re-instruction-fetch request is output. Furthermore, the RSBR 140 stops receiving a new entry.

The RSBR 140 then stores an entry number of the entry of the re-instruction fetch request. The RSBR 140 adds a pointer 146 that is RTNSTK_REPAIR_END_POINTER representing the stored entry number to the RSBR queue.

In the cycle following the output of the re-instruction fetch request, the RSBR 140 then searches for a call instruction and a return instruction in order from the entry of the TOQ indicated by the pointer 141 to the entry of the re-instruction fetch request indicated by the pointer 146. For example, the RSBR 140 prepares a pointer that is RTNSTK-REPAIR-PTR sequentially indicating the entries from the pointer 141 to the pointer 146. The RSBR 140 then reads a flag representing whether the entry indicated by RTNSTK-REPAIR-PTR is a call instruction or a return instruction and determines whether each entry is a call instruction, a return instruction, or another instruction. On detecting a call instruction, the RSBR 140 pushes the RAS fetch 171 using the call instruction. On detecting a return instruction, the RSBR 140 pops the RAS fetch 171 using the return instruction. In the case in FIG. 3, the RSBR 140 detects a call instruction that is Call func. Z between the pointer 141 and the pointer 146. The RSBR 140 thus pushes the RAS fetch 171 using Call func. Z (step S3). Accordingly, the RAS fetch 171 re-reflects x+8 that is the return destination address of Call func. Z.

Thereafter, the RSBR 140 transmits a signal on completion of the process of the instruction to the CSE 150 in order. The CSE 150 determines that the branch instruction ends and determines ending of execution of the branch instruction. The RSBR 140 transmits the signal on completion of the process of the instruction to the branch prediction system 170. When a process of a call instruction completes, the branch prediction system 170 pushes the PAS complete 172 using the call instruction. When a process of a return instruction completes, the branch prediction system 170 pops the RAS complete 172 using the return instruction. At this point, the pointer 141 indicate the entry number of the top branch instruction that has not ended. In other words, by starting execution from the entry of the TOQ indicated by the pointer 141, the RSBR 140 is able to restart the process.

Figure 4:
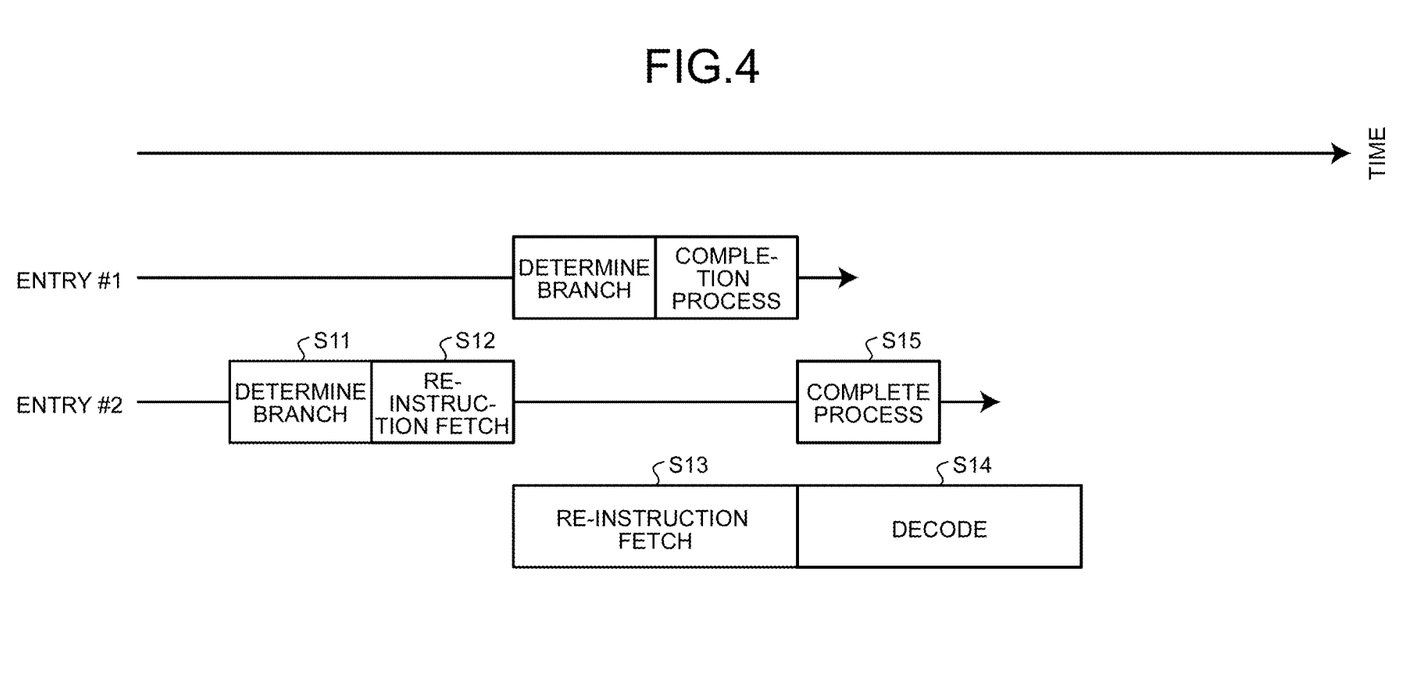
FIG. 4 is a diagram illustrating an order of processes of respective entries that are stored in an RSBR queue in a case where a re-instruction-fetch is performed output order.

FIG. 4 is a diagram illustrating an order of processes of respective entries that are stored in a RSBR queue in a case where a re-instruction-fetch is performed output order. With reference to FIG. 4, the process of each of the entries that are stored in the RSBR queue in the case where a re-instruction-fetch is performed output order will be described next. In FIG. 4, an entry #1 is the entry of the TOQ of the RSBR queue and an entry #2 is an entry after the entry #1.

In the state where the process of completing execution of the instruction of the entry #1 has not ended, the RSBR 140 determines that the branch of the already-executed branch instruction is taken and detects a branch prediction error (step S11) and stores the entry #2 of the re-instruction-fetch request in the RSBR queue.

Before the entry #2 reaches the TOQ, the RSBR 140 outputs a re-instruction-fetch request of the branch instruction of the entry #2 (step S12). In other words, without waiting for execution of the instruction of the entry #1, the RSBR 140 causes the instruction fetch address generator 101 to perform a re-instruction-fetch of the branch instruction of the entry #2 out of order.

Thereafter, the RSBR 140 outputs the instruction of the entry #1 that is positioned at the TOQ. It is determined that the branch is taken according to the instruction of the entry #1 and the process of executing the instruction of the entry #1 completes. On receiving the re-instruction-fetch request that is output from the entry #2 in parallel with execution of the instruction of the entry #1, the instruction fetch address generator 101 executes the re-instruction-fetch (step S13). Thereafter, the instruction decoder 105 decodes the fetched instruction (step S14).

By outputting the re-instruction-fetch request without waiting for completion of the process of the instruction of the entry #1, the RSBR 140 is able to complete the process of the instruction of the entry earlier by the time until completion of the process of execution of the instruction of the entry #1 (step S15). In other words, the RSBR 140 is able to hide a delay due to the process of the instruction fetch in the pipeline.

Furthermore, the RSBR 140 according to the embodiment reflects, in the RSA complete, the result of a call instruction or a return instruction among entries before the entry on which the re-instruction-fetch is to be performed because the branch-prediction error occurs in the RSBR queue and that is executed out of order. This make it possible to maintain accuracy of branch prediction while hiding the time of the process of the instruction fetch by the pipeline.

Figure 5:
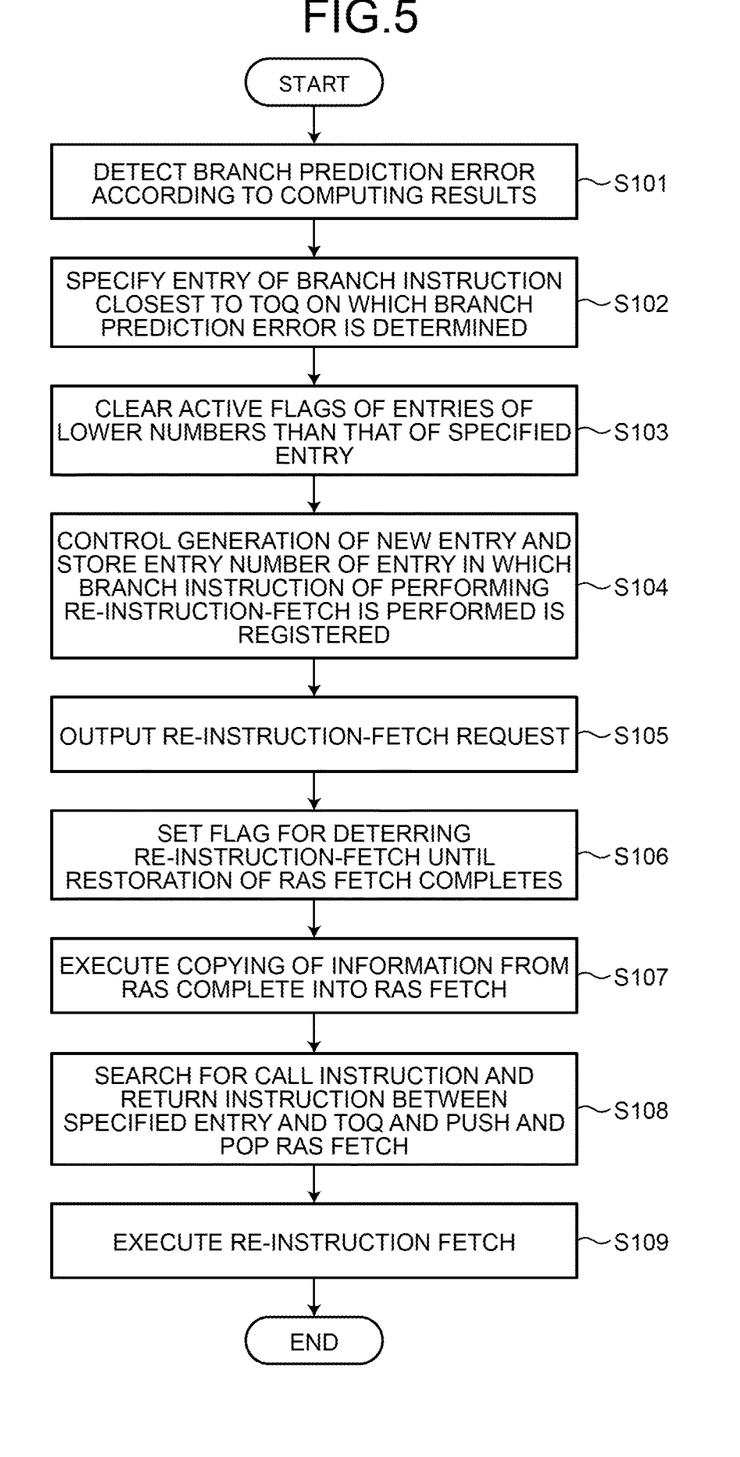
FIG. 5 is a flowchart of the re-instruction-fetch process performed by the computing device according to the embodiment.

FIG. 5 is a flowchart of the re-instruction-fetch process performed by the computing device according to the embodiment. With reference to FIG. 5, a flow of the re-instruction-fetch process performed by the CPU 10 will be described.

The RSBR 140 acquires a computing result of computing that is executed by the computing units 121 and 131 and detects a branch prediction error on a branch prediction that is already executed (step S101).

The RSBR 140 stores, in the RSBR queue, an entry of a re-instruction-fetch request of the branch instruction on which the branch prediction error is detected. The RSBR 140 then specifies an entry of the branch instruction that is the closest to the TOQ and on which the branch prediction error is determined (step S102).

The RSBR 140 clears active flags of entries of lower numbers than that of the specified entry among the entries stored in the RSBR queue, that is, entries that are stored after the specified entry. The RSBR 140 thus clears the instruction pipeline (step S103).

The RSBR 140 controls generation of a new entry and stores an entry number of the entry in which the branch instruction of performing the re-instruction-fetch is performed is registered (step S104).

The RSBR 140 outputs a re-instruction-fetch request based on the specified entry (step S105).

The RSBR 140 sets a flag for deterring the re-instruction-fetch until restoration of the RAS fetch 171 completes with respect to the re-instruction-fetch request (step S106).

The RSBR 140 executes copying of the information from the RAS complete 172 into the RAS fetch 171 (step S107).

The RSBR 140 searches for a call instruction and a return instruction between the specified entry and the TOQ and pushes and pops the RAS fetch 171 according to the call instruction and the return instruction (step S108).

Thereafter, the RSBR 140 removes the flag for deterring the re-instruction fetch that is set for the re-instruction-fetch request and causes the instruction fetch address generator 101 to execute the re-instruction fetch (step S109).

As described above, the computing device according to the embodiment determines to execute a re-instruction fetch with respect to a branch instruction according to a branch prediction error and causes a RAS fetch to reflect a result of a process according to a call instruction or a return instruction before the re-instruction fetch. The computing device then performs the re-instruction fetch out of order. This makes it possible to, when performing the re-instruction fetch out of order, maintain information that is stored in the RAS fetch before the re-instruction-fetch and maintain accuracy of prediction of a return address stack. Accordingly, it is possible to increase computing performance while maintaining accuracy of prediction.

The above-described processor including the branch instruction processing system and the branch prediction system is not limited to a superscalar processor, the processor may be a general processor. The processor is not limited to an ARM-based processor, and the processor may be another processor. The processor is installable in a computer that is used for a server and high performance computing (HPC).

According to one aspect, the disclosure makes is possible to increase computing performance while maintaining accuracy of prediction.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computing device comprising:
a memory;
a processor coupled to the memory, the processor including a pipeline that fetches an instruction from a program and executes the instruction; and
a queue that stores a plurality of entries including a call instruction, a return instruction, and a branch instruction respectively from the program, the pipeline being caused to execute the branch instruction,
wherein the processor is configured to:
store prediction information in a first storage, the prediction information being obtained from the call instruction, the call instruction being fetched by the pipeline, acquire the prediction information from the first storage, the prediction information being used by the return instruction, the return instruction being fetched by the pipeline, delete the prediction information, store the prediction information in a second storage after completion of execution of the call instruction by the pipeline, and delete the prediction information from the second storage after completion of execution of the return instruction by the pipeline; and
detect a branch prediction error with respect to the branch instruction,
specify a first entry, wherein the first entry is the closest entry to a top of the queue that is to be re-executed in response to the branch prediction error,
for each first call instruction and each first return instruction stored in entries closer to the top of the queue than the first entry is, store and delete the prediction information in and from the first storage, and
cause the pipeline to re-execute the first entry.

2. The computing device according to claim 1, wherein the processor is configured to copy information that the second storage stores into the first storage and store and delete the prediction information in and from the first storage according to the call instruction and the return instruction that are stored in the entries closer to the top of the queue than the first entry is.

3. The computing device according to claim 1, wherein the processor is configured to specify, on detecting the branch prediction error with respect to the branch instruction, the first entry between an entry in which the branch instruction is re-executed and the top of the queue.

4. The computing device according to claim 1, wherein the processor is configured to exclude execution by the pipeline of the branch instruction that is to be executed according to an entry closer to the top of the queue than the first entry.

5. The computing device according to claim 1, wherein the processor is configured to request the pipeline to re-execute the first entry and cause the pipeline to wait to re-execute the first entry until storing and deleting the prediction information in and from the first storage complete.

6. A computing method executed by a computer including a pipeline that fetches an instruction from a program and executes the instruction, the method comprising:
storing prediction information in a first storage, the prediction information being obtained from a call instruction from the program that is fetched by the pipeline, acquiring the prediction information from the first storage, the prediction information being used by a return instruction from the program that is fetched by the pipeline, and deleting the prediction information;
storing the prediction information in a second storage after completion of execution of the call instruction by the pipeline and deleting the prediction information from the second storage after completion of execution of the return instruction by the pipeline;

storing, in a queue, a plurality of entries including the call instruction, the return instruction, and a branch instruction from the program, the pipeline being caused to execute the branch instruction;

detecting a branch prediction error with respect to the branch instruction;

specifying a first entry, wherein the first entry is the closest entry to a top of the queue that is to be re-executed in response to the branch prediction error;

storing and deleting the prediction information in and from the first storage for each first call instruction and each first return instruction that are stored in entries closer to the top of the queue than the first entry is; and causing the pipeline to re-execute the first entry.

7. An information processing device including a computing device comprising:

a memory;

a processor coupled to the memory, the processor including a pipeline that fetches an instruction from a program and executes the instruction; and a queue that stores a plurality of entries including a call instruction, a return instruction, and a branch instruction respectively from the program, the pipeline being caused to execute the branch instruction, wherein the processor is configured to:

store prediction information in a first storage, the prediction information being obtained from the call instruction, the call instruction being fetched by the pipeline, acquire the prediction information from the first storage, the prediction information being used by the return instruction, the return instruction being fetched by the pipeline, delete the prediction information, store the prediction information in a second storage after completion of execution of the call instruction by the pipeline, and delete the prediction information from the second storage after completion of execution of the return instruction by the pipeline; and detect a branch prediction error with respect to the branch instruction, specify a first entry, wherein the first entry is the closest entry to a top of the queue that is to be re-executed in response to the branch prediction error, for each first call instruction and each first return instruction stored in entries closer to the top of the queue than the first entry is, store and delete the prediction information in and from the first storage, and cause the pipeline to re-execute the first entry.

* * * * *